A. G. SNELL.
Telegraph-Switch.

No. 227,851.                Patented May 18, 1880.

UNITED STATES PATENT OFFICE.

ADOLPHUS G. SNELL, OF NEW HAVEN, CONN., ASSIGNOR OF ONE-HALF OF HIS RIGHT TO GEORGE F. PERKINS, OF HOLYOKE, MASS.

TELEGRAPH-SWITCH.

SPECIFICATION forming part of Letters Patent No. 227,851, dated May 18, 1880.

Application filed February 14, 1880.

*To all whom it may concern:*

Be it known that I, ADOLPHUS G. SNELL, of New Haven, in the county of New Haven and State of Connecticut, have invented a new Improvement in Telegraph - Switches; and I do hereby declare the following, when taken in connection with the accompanying drawings and the letters of reference marked thereon, to be a full, clear, and exact description of the same, and which said drawings constitute part of this specification, and represent, in—

Figure 1:
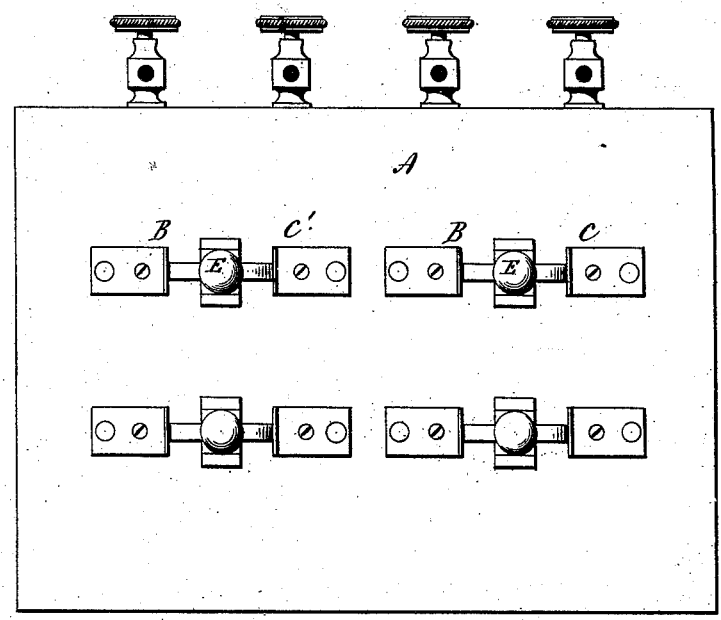
Figure 2:
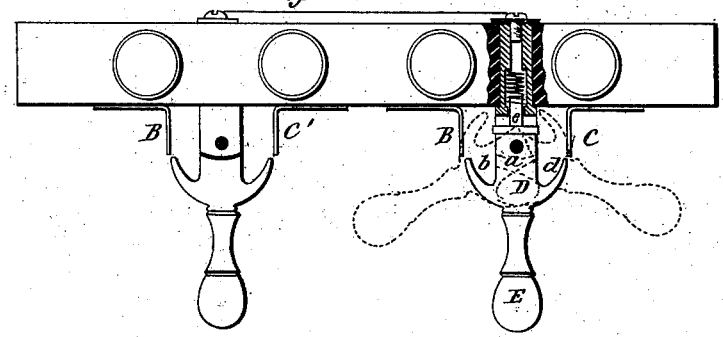

Figure 1, front view; Fig. 2, sectional top view.

This invention relates to an improvement in switches for connecting different circuits or changing the circuit from one connection to another, commonly called "electric" switches; and it consists in the construction, as hereinafter described, and particularly recited in the claim.

A represents the switch-board, to which the various lines are brought in the usual manner. B is a flat metal spring in connection with one line; C, a light spring in connection with a second line. Midway between these springs a lever, D, is hung upon a pivot, $a$, extending outward in the form of a handle, E. From one side of the lever an arm, $b$, extends toward the spring D, and on the opposite side a similar arm, $d$, extends toward the spring C, but so as not to touch either one or the other. The outer surface of the arms is in form of a segment, the center of which is in front of the pivot $a$, and so that when turned toward either spring, as seen in broken lines, Fig. 2, the arm will bear with considerable force against the spring. In rear of the pivot a spring-follower, $c$, is arranged to bear against the square end of the lever, so as to force and hold it to the central or disconnected position, but yet allow the lever to be turned in either direction.

The wires of different lines are brought each to one of the springs of one of the switches, and connections are made from the bearing of one switch to the bearing of the next, so that any one line may be put in connection with any other line by turning the switches accordingly—that is to say, supposing the line in connection with the spring C is to be connected with the line running from the spring C' of another switch, the levers are respectively turned so as to make connection with the springs C and C', and as the two levers are connected, as by the line $f$, it follows that connection is made through the levers between the two lines running from the said two springs C C'.

The levers may be used with a single arm and single spring; but duplicating the arm avoids one-half the number of levers which would be required in that case.

I claim—

An electric switch consisting of the spring in connection with one line, with the pivoted lever D, constructed with an arm extending toward said spring, but not in connection with it, arranged to be turned to bring said arm in connection with said spring, with a spring-follower arranged to engage said lever when in its disconnected position, substantially as described.

ADOLPHUS G. SNELL.

Witnesses:
JOHN E. EARLE,
JOS. C. EARLE.